Sept. 14, 1965   U. C. GROSSMANN   3,205,669
RECOVERY OF NATURAL GAS LIQUIDS, HELIUM CONCENTRATE, AND
PURE NITROGEN
Filed Aug. 15, 1960   9 Sheets-Sheet 1

INVENTOR.
U. C. GROSSMANN
BY
*Hudson & Young*
ATTORNEYS

INVENTOR.
U.C. GROSSMANN
BY
ATTORNEYS

INVENTOR.
U.C. GROSSMANN
BY
ATTORNEYS

FIG. 11

INVENTOR.
U.C. GROSSMANN
BY
ATTORNEYS

United States Patent Office 3,205,669
Patented Sept. 14, 1965

3,205,669
RECOVERY OF NATURAL GAS LIQUIDS, HELIUM
CONCENTRATE, AND PURE NITROGEN
Ugo C. Grossmann, Bartlesville, Okla., assignor to Phillips Petroleum Company, a corporation of Delaware
Filed Aug. 15, 1960, Ser. No. 49,597
4 Claims. (Cl. 62—23)

This invention relates to the recovery of natural gas liquids. It also relates to the recovery of a helium concentrate from a natural gas. The invention also relates to the recovery of nitrogen-rich fuel gas and of high purity nitrogen from a natural gas.

In one aspect of the invention, it relates to the recovery of natural gas liquids from natural gas containing helium by operating a helium concentrate recovery system employing external refrigeration at the cold end and a heat pump cycle at the warm end, as further described below. In another aspect of the invention, it relates to the removal of nitrogen from a natural gas, to purification of the removed nitrogen, its use in the system to derime the cold plant periodically, to purge the insulation during operation, the removal of the nitrogen, as herein, permitting an increased recovery of natural gas liquids from the natural gas. In a further aspect of the invention, it relates to the operation of a natural gas processing system in which there is obtained an increased recovery of natural gas liquids by the removal of nitrogen from natural gas in the system which is so operated as to obtain a helium concentrate, in one embodiment the overall operation being accomplished without external refrigeration using expansion to a low pressure of a plurality of residue liquids of the system, for example $C_1$, $C_2$, $C_3$ and $C_3+$ hydrocarbon product streams, to convert energy in the feed gas which has been cooled under pressure to refrigeration values via the Joule-Thomson effect; in another embodiment, using external refrigeration, employing a heat pump cycle to carry refrigeration value from a stream containing the same and from a place in said stream from which it can be taken without causing a temperature difference condition inimical to suitable heat exchange between said stream and a stream which it is cooling, to another point in said stream at which a temperature pinch or insufficient temperature difference between it and a stream which it is being used to cool would otherwise exist. More specifically, in the first-mentioned embodiment in which no external or added refrigeration is employed, internal refrigeration is supplied by separating at selected temperatures from a stream of natural gas under pressure, being condensed by heat interchange with streams now to be defined, streams of liquids at a plurality of points, expanding at least one of these streams, taking into account its particular composition, in such a manner that it is evaporated in heat exchange with said stream being condensed, thus recovering as completely as possible from each of the separated streams the latent, as well as sensible, heat values it can provide, the temperatures of said streams at which each is separated as a liquid from said stream being condensed and, therefore, the point of separation thereof being selected so that the thermodynamic irreversibilities of the heat exchange of said streams will be practically as small as possible, the expanded streams after serving as refrigerants, in the system, in one variant being recombined and recompressed and used, or separately recompressed and used, or separately used and then recombined and used as fuel gas or in extraction of liquid petroleum gases. In a further aspect of the invention, it relates to a combination of steps in which a vapor obtained from partially cooled natural gas from which a helium concentrate is eventually to be separated, the vapor being obtained by phase separation, is made to do work in an expansion engine or zone and then recombined with the main gas stream to provide additional refrigeration directly therein. In a still further aspect of the invention, the last-mentioned vapor is first heat interchanged and then made to do work, as later described. In a further aspect, still, the invention relates to a combination of steps in which a natural gas containing helium is cooled to obtain therefrom a helium concentrate and a residual liquid containing nitrogen and methane, and in which the residual stream is first used to provide cooling of the natural gas yielding the concentrate and then compressed, as a liquid, and then further used to cool the natural gas on its way to the step in which said concentrate is separated.

In another aspect of the invention, the first liquid withdrawn from the partially cooled and partially liquefied feed gas, said liquid containing most of the heavy hydrocarbons in said feed gas, is expanded to an intermediate pressure and then warmed and partially vaporized by countercurrent heat exchange with feed gas until most of the lighter components, especially methane, of said withdrawn liquid are in the vapor phase, phase separating the partially vaporized withdrawn liquid stream and thus obtaining a residue gas rich in methane and a liquid stream rich in liquefied petroleum gases. The latter is expanded to a low pressure, heat exchanged with incoming feed gas, and passed to a natural gasoline plant where increased recovery of liquefied petroleum gases and/or smaller recovery equipment results because of the previous removal of methane as described above.

It is an important feature of the invention that it permits, among other advantages, the increased recovery of helium concentrate from a natural gas by virtue of the fact that most of the liquefied hydrocarbons are removed from the non-liquefied gas containing the helium at early stages in the process where the temperatures are relatively high and helium solubility in the separated liquids is negligibly low. Thus, the volume of liquid hydrocarbon remaining when the helium concentrate is finally separated from said liquid at very low temperature is so small as to insure low soluble loss of helium in said liquid.

It is another important feature of the present invention that it permits, among other advantages, the recovery of more natural gas liquids from natural gas by removing nitrogen from the natural gas by means of the helium extraction process or processes herein described, or as specifically accomplished from a compressed and cooled natural gas liquid, as herein evident. Thus, it has been conceived that, by performing certain steps in combination, as herein described, the various objects of the invention, as herein set forth, can be accomplished, in several modifications, later described in detail.

The recovery of natural gas liquids and helium from natural gas is old and well known. In the design of systems for the recovery of a gas or liquid or helium from natural gas or for the recovery of a gas from a mixture containing it and at least one other gas, there is sometimes needed additional refrigeration (heat removal) to avoid a temperature difference narrowing or pinch in a heat exchange zone. It has been conceived that such additional refrigeration can be taken from a stream at a temperature level at which it is available by employing a heat pump cycle and thus reducing materially the energy requirements for the system as a whole.

It is an object of this invention to provide a method for the separation of gases. It is another object of this invention to provide an apparatus for the separation of gases. It is a further object of this invention to provide an improved method for the recovery of various constituents of natural gases, for example, natural gas liquids, helium, nitrogen, etc. It is a further object of this invention to provide for the separation of various constituents of natural gas, obtained under pressure, serves as source of refrigeration in a combination of steps, as herein set forth. It is a further object of the invention to provide for the redistribution of refrigeration values in a gas separation system in which some external refrigeration must be employed. Yet another object of the invention is to provide a method for transferring refrigeration capacity from a place where it is available in a system to another place in the same system. Still another object of the invention is to obtain from a vapor separated from a natural gas stream being condensed additional refrigeration value.

Other aspects, objects and the several advantages of the invention are apparent from a study of the disclosure, the drawing and the appended claims.

According to the present invention, improved yields of natural gas liquids are obtained from a natural gas by processing said gas to remove nitrogen therefrom because more of the natural gas liquids can be extracted from the gas and still provide a residue gas with required heating value by virtue of the removal of the nitrogen.

Also, according to the present invention, there is provided a method for the recovery of a gas from a mixture of gases by refrigeration in which a ΔT pinch is avoided in a countercurrent heat exchange by means of transferring available refrigeration to the place where the pinch would otherwise occur employing a heat pump cycle.

Also, according to the present invention, nitrogen which is concentrated in the system is purified and used in the system to purge and otherwise benefit the same.

Also, according to the invention, there is provided a natural gas processing operation in which a vapor obtained from natural gas which has been cooled and partially condensed under pressure is made to do work in an expansion zone and the cooled expanded gas is admixed with the natural gas at a lower pressure to supply refrigeration thereto. In another embodiment, the vapor is passed into heat exchange relationship with the gas before the vapor is passed to the expansion zone.

Further, according to the invention, there is provided a processing of natural gas in which there are removed from the same as it is gradually condensed under pressure a plurality of streams. The streams are, each of them, expanded to a lower pressure or in two stages to an intermediate pressure and then to a low pressure, such that, depending upon their composition with which said lower pressure is correlated, these streams will take up their latent heat of evaporation while being passed in heat exchange with natural gas being cooled, and said streams are passed into said heat exchange relationship.

Still according to the invention, the residual liquid obtained upon separation of the helium concentrate can be and is during its heat interchange with cooling natural gas on its way to the step in which the concentrate is obtained, compressed as a liquid and further used to cool said natural gas. In one modification, the compressed liquid is admixed with a residual liquid obtained from the natural gas in a step prior to that in which the concentrate is obtained.

An example of a refinement of the process of FIGURE 2 is shown in FIGURE 3 wherein a stream consisting essentially of methane and nitrogen is separated from condensed natural gas, the further separation of this stream into a residue gas removed as a liquid phase and a nitrogen-rich gas, which can be used as a fuel gas, from which, at least in part, high purity nitrogen can be produced as described herein.

A refinement of FIGURE 3 is shown in FIGURE 4 wherein a vapor is separated from a partially condensed stream of natural gas, work is performed by said vapor while it expands and the expanded now cooled vapor is returned to part of the condensing stream from which it originally had been separated.

Compression of the stream at this point, as just discussed, results in the saving of considerable energy and the addition of less compression heat to the stream since it will be apparent to one skilled in the art that compression of a liquid stream requires less energy than compression of the same stream in the gaseous state. The incorporation of the compression step at this point of the method is, therefore, based upon an important concept of the invention.

Figure 1:
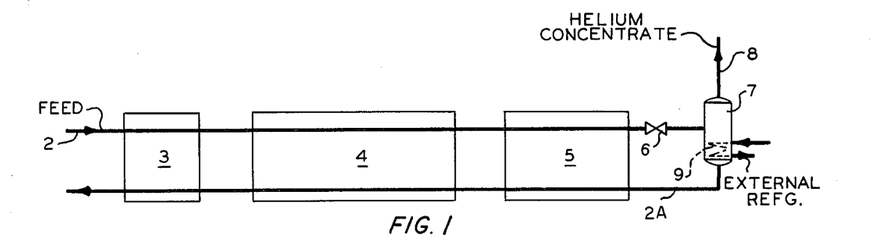
FIGURE 1 is a diagrammatic showing of a process for the recovery of a helium concentrate, that is, a mixture consisting essentially of helium and nitrogen, from a natural gas in which the feed gas is cooled and most of it liquefied, the mostly liquefied gas is passed to a zone of reduced pressure, further refrigerated by external means, and the concentrate, which is in the gaseous state, is separated from the remaining liquid phase, and the liquid phase is vaporized and heated in heat exchange with feed gas being refrigerated therewith to mostly liquefy the same, thus recovering a substantial amount of the refrigeration originally imparted to the feed gas.

Referring now to FIGURE 1, incoming feed 2 passes through heat exchange zones 3, 4 and 5, shown diagrammatically, in countercurrent heat exchange with cold vaporizing residue gas from which a helium concentrate has been removed, as later described. Feed gas stream 2 is under higher pressure than vaporizing residue gas stream 2A so as to cause the feed gas to mostly liquefy as a somewhat higher temperature than the temperature at which low pressure stream 2A vaporizes, thereby permitting the transfer of heat from stream 2 to stream 2A. Mostly liquefied stream 2 is flashed through valve 6 into separator 7 from which a helium concentrate is removed at 8. Additional refrigeration is provided in separator 7 by coil 9 which is part of a nitrogen refrigeration cycle. Liquid phase is removed from separator 7, forming stream 2A. It is this phase which is passed into countercurrent heat exchange with the incoming gas feed in heat exchange zones 3, 4 and 5.

Figure 2:
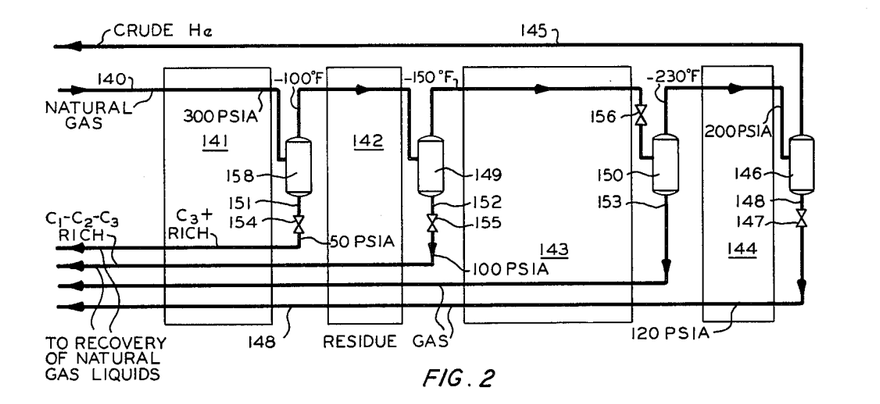
FIGURE 2 illustrates diagrammatically the application of the principle of separation of a plurality of product streams from a stream being condensed and the expansion of at least one of said product streams to pressures sufficiently low as to permit heat exchange of said product streams with the incoming feed stream without requiring external or auxiliary refrigeration.
Figure 3:
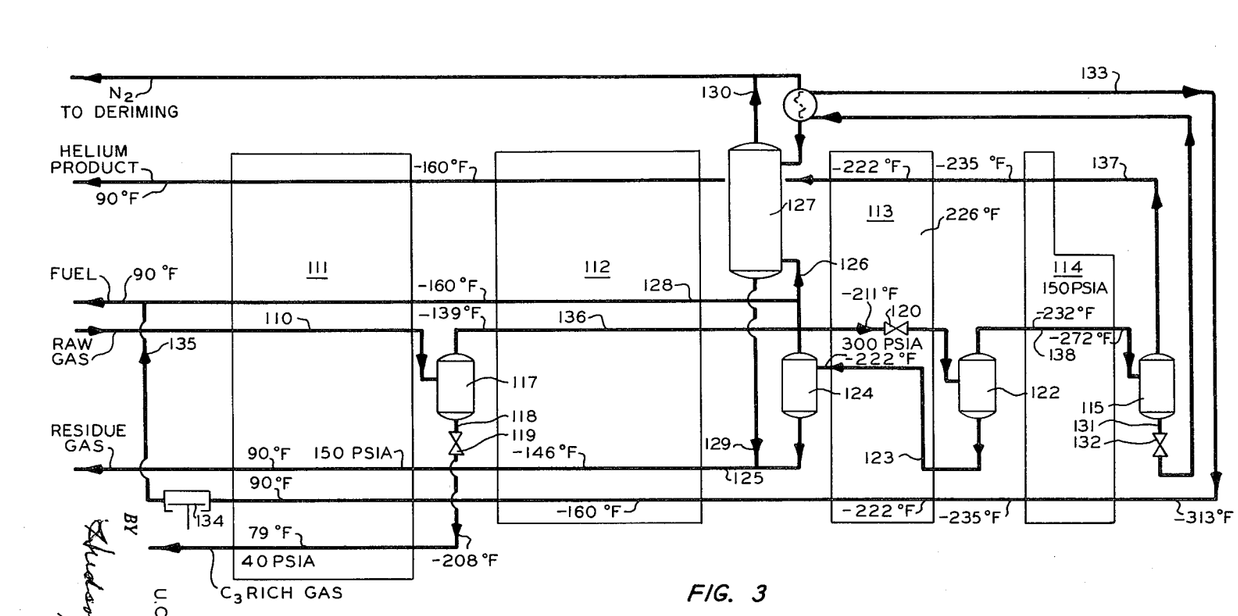

FIGURE 2 is an illustration of a general process for the recovery of helium concentrate and natural gas liquids concentrate from a natural gas stream which operates without external refrigeration. Referring now to FIGURE 2, natural gas stream 140 is passed successively through heat exchangers 141, 142, and 143, expanded through valve 156, passed through heat exchanger 144, and discharged into phase separator 146. A liquid residue gas is expanded through valve 147 and passed by pipe portion of stream 128 is passed by pipe 126 into nitrogen purification column 127. Bottoms from distillation tower 127 are passed by pipe 129 to pipe 125. Overhead from distillation tower 127 consists essentially of pure nitrogen which is removed by pipe 130. A portion of the overhead is recycled as reflux and is cooled by heat exchange with bottoms from separator 115 which are removed therefrom by pipe 131 through expansion valve 132 and which are ultimately passed by pipe 133 through heat exchangers 114, 113, 112, and 111 to compressor 134. This stream is suitable for use as fuel and is pumped by compressor 134 through pipe 135 into combination with the fuel gas in pipe 128. The nitrogen obtained in this embodiment can be used, as already discussed herein. Uncondensed helium containing gas, also containing nitrogen and some methane, is passed by pipe 137 through heat exchangers 114, 113, 112, and 111 as helium containing product of the process.

Table I presents material balance data for the process of FIGURE 3.

TABLE I

*(Material balance for FIGURE 3)*

[Basis: 100 mols of feed gas]

| Stream No. | 110 | 118 | 136 | 137 | 128 | 125 | 138 | 123 | 133 | 130 |
|---|---|---|---|---|---|---|---|---|---|---|
| Helium, mols | 0.75 | 0.003 | 0.747 | 0.727 | 0.018 | 0.001 | 0.728 | 0.019 | 0.001 | |
| Nitrogen, mols | 14.84 | 0.607 | 14.233 | .615 | 2.146 | 9.281 | 2.737 | 11.496 | 2.122 | 0.070 |
| Methane, mols | 71.72 | 13.193 | 58.527 | .083 | 1.445 | 55.583 | 1.498 | 57.029 | 1.415 | .001 |
| Ethane, mols | 6.19 | 4.665 | 1.525 | | .001 | 1.522 | 0.001 | 1.524 | | |
| Propane+, mols | 6.50 | 6.101 | .399 | | | .399 | | .399 | | |
| Total | 100.0 | 24.569 | 75.431 | 1.425 | 3.610 | 66.786 | 4.964 | 70.467 | 3.539 | 0.071 |

148 into heat exchange relationship with stream 140. The helium containing gas removed at pipe 145 contains a large proportion of nitrogen and the removal of this nitrogen makes possible higher recovery of natural gas liquids from streams 151 and 152 because of the higher heating value of residue gas in pipes 153 and 148. In the embodiment shown in FIGURE 2, there are removed condensed portions of natural gas stream 140 which are respectively passed by way of pipes 151, 152, 153, and 148 through expansion valves 154, 155, and 147 by means of which the liquids are expanded to, for example, the indicated pressures at which their latent heats of evaporation are available for heat exchange with stream 140, as shown. Thus, each liquid fraction is throttled to a suitable pressure so that, according to its particular composition, it is completely evaporated in heat exchange with the condensing main stream yielding the latent and sensible heat refrigeration values.

Referring now to FIGURE 3, in which there is shown a process similar to that shown in FIGURE 2, for recovering natural gas liquids and helium concentrate from natural gas without need for auxiliary refrigeration and in which there is also shown production of pure nitrogen in a distillation tower in which nitrogen is extracted from a fuel gas obtained in the system, raw gas is passed by pipe 110 through heat exchange zones 111, 112, 113, and 114 into helium concentrate separator 115. As the gas is cooled, a propane+ rich fraction is removed by drum 117, pipe 118, and valve 119 and passed in countercurrent heat exchange with the raw gas in pipe 110 in exchanger 111. The remaining incoming gas, after cooling in exchangers 112 and 113, is passed through expansion valve 120 into phase separator 122 from which a liquid fraction rich in nitrogen and methane is removed by pipe 123 and passed through heat exchanger 113 to phase separator 124 from which bottoms are passed by pipe 125 into heat exchange with the raw gas in heat exchangers 112 and 111. Overhead from separator 124 is passed by pipe 128 through heat exchangers 112 and 111 and ultimately used, as desired, for fuel. A Referring now to FIGURE 4, a modification of FIGURE 3, a natural gas stream 90 corresponding to 136 of FIGURE 3, containing helium is cooled in heat exchanger 91 and passed to separator 92. Liquid from the separator is passed by pipe 93, expansion valve 94 into separator 95 from which a liquid phase is passed by pipe 96A into heat exchanger 91 for heat exchange with stream 90. Overhead from separator 95 passes by pipe 96 through heat exchangers 97 and 98 into separator 99 from which a helium concentrate is taken off overhead by pipe 100 and passed into heat exchange with the incoming natural gas in exchangers 97 and 91. Bottoms from separator 99 are passed by pipe 101, expansion valve 102 into heat exchange with incoming natural gas in exchangers 98, 97 and 91. According to the invention to supply additional refrigeration, overhead from separator 92 is passed by pipe 103 through turbine or other expansion engine 104 and pipe 105 to pipe 96. The expanded gases from the expansion engine supply additional refrigeration value to the stream in pipe 96. The engine produces work which can be used or wasted as desired, as will be understood by one skilled in the art.

Figure 4:
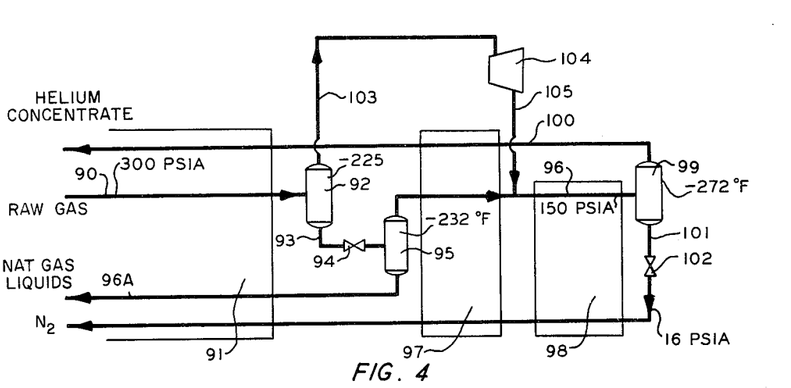
Figure 5:
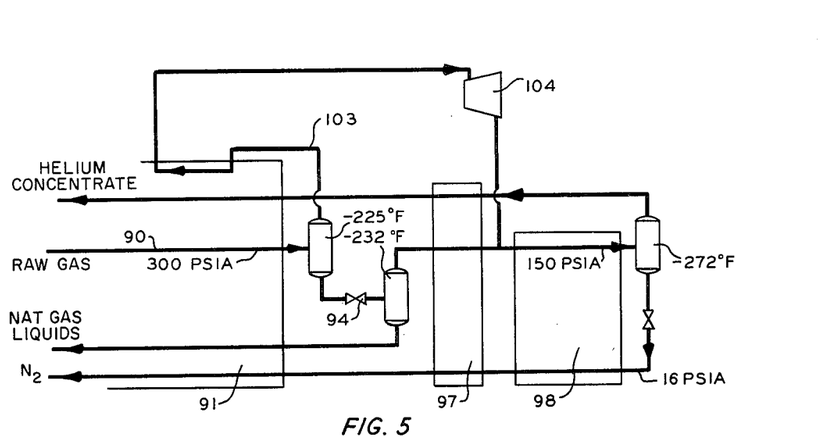
FIGURE 5 is a modification of the arrangement of FIGURE 4 and shows the use of the vapor separated from the condensing stream to cool the condensing stream before said vapor is made to do work by expansion.

FIGURE 5 is substantially identical to FIGURE 4 except that overhead pipe 103 passes through heat exchanger 91 and cools incoming gas while being heated before being passed to turbine 104. This is to superheat the feed 103 to the engine in order to avoid or reduce the formation of liquid in said engine which could cause engine damage and/or decreased expansion efficiency.

Referring to both FIGURES 4 and 5, it will be seen that vapor remaining ahead of valve 94 but after the incoming gas has been cooled in 91 is made to do work to remove therefrom energy which means that refrigeration is obtained at a decreased temperature level where it is most needed in quantities sufficient to supply the small lack of refrigeration eventually resulting in temperatures under —200° F., more specifically in this example under —232° F. The vapor being expanded through the engine or turbine is withdrawn from separator 92 as a saturated vapor containing essentially helium, nitrogen and methane. And FIGURE 5 shows that instead of passing the saturated vapor directly to the engine, it can be superheated by heat exchange in 91, thus generating and delivering refrigeration also upstream of valve 94.

Figure 6:
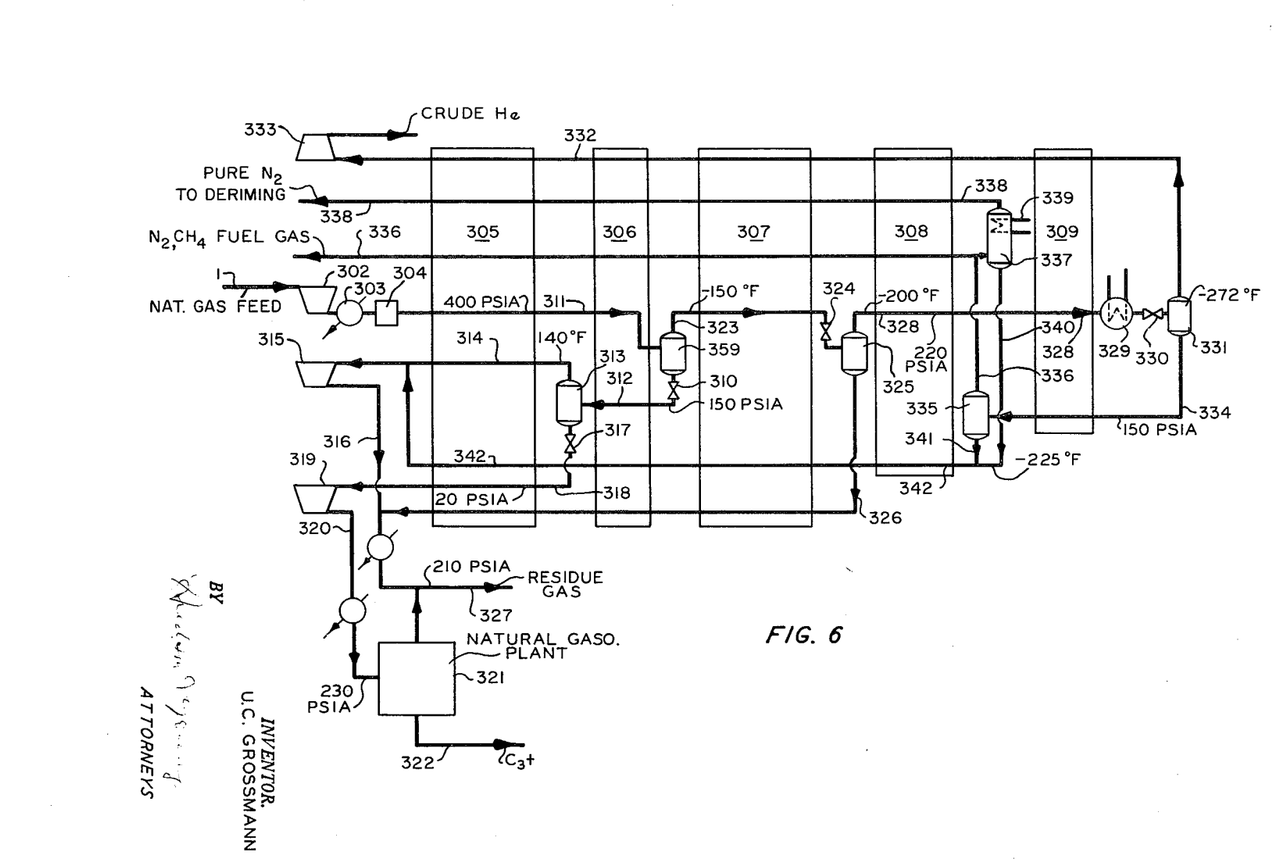
FIGURE 6 illustrates diagrammatically the early removal of condensed heavy hydrocarbons from a partially cooled and partially liquefied natural gas stream and the removal of essentially methane from said liquid heavy hydrocarbons by expansion, partial vaporization by heat exchange with incoming feed gas, and phase separation.

FIGURE 6 shows a process flow scheme which features the removal of methane from a natural gas liquids stream condensed from a natural gas which also produces high-purity nitrogen and helium concentrate. Natural gas feed 301 is compressed by compressor 302, cooled by cooler 303, treated by conventional means for removal of carbon dioxide, hydrogen sulfide, and water by means 304, cooled and the heavy hydrocarbons contained therein condensed by heat exchange with cold streams, as described later, in zones 305 and 306. The partially condensed natural gas 311 is then discharged into phase separator 359 from which the liquid hydrocarbons are withdrawn through expansion valve 310 and pipe 312, partially vaporized by heat exchange with incoming feed gas in heat exchange zone 306 and discharged into phase separator 313. A gaseous phase, consisting largely of methane is withdrawn from phase separator 313 by pipe 314, warmed in zone 305, compressed by compressor 315 and delivered from the process as residue gas via pipe 316. Returning to phase separator 313, the liquid phase consisting largely of natural gas liquids concentrate is expanded through valve 317 into pipe 318, warmed by passage through heat exchange zone 305, compressed by compressor 319, and delivered to natural gasoline plant 321 by pipe 320. Because methane has been removed from stream 320 as described above, smaller equipment is required in natural gasoline plant 321 for further concentration of said natural gas liquids. The final natural gas liquids product is delivered from natural gasoline plant 321 via pipe 322.

Returning now to phase separator 359, non-condensed gas is taken overhead by pipe 323, further cooled and partially condensed in heat exchange zone 307, expanded to a lower pressure by passage through valve 324 and discharged into phase separator 325. Liquid hydrocarbons are withdrawn from the bottom of separator 325 by pipe 326, warmed in heat exchange zones 307, 308 and 305 while cooling incoming gas feed, and blended with stream 316 which exits from the plant as residue gas stream 327. The gaseous overhead from separator 325 is passed by pipe 328 through heat exchange zones 308 and 309 wherein it is further cooled with additional liquefaction and then through heat exchanger 329 where it is cooled further by means of external refrigeration, not shown. From exchanger 329, the mostly liquefied stream 328 is expanded through valve 330 and discharged into phase separator 331. The helium concentrate product is taken overhead from separator 331 by pipe 332 and passed through heat exchange zones 309, 308, 307, 306 and 305 wherein it is warmed while cooling the incoming feed gas stream. The warmed helium product is finally compressed by compressor 333 and delivered from the plant.

Liquid phase, consisting essentially of methane and nitrogen, is removed from separator 331 through pipe 334, warmed and partially vaporized in heat exchange zone 309, and discharged into phase separator 335. Gaseous overhead from separator 335 is removed by pipe 336, passed through heat exchange zones 308, 306, 307 and 305 and used as fuel gas to power the plant or for other purposes. At least part of the nitrogen-methane fuel gas in pipe 336 is fed to distillation column 337 from which is recovered overhead a high purity nitrogen product 338 that may be used for periodic deriming of the plant and for purging the insulation. Reflux for the column 337 is supplied by application of external refrigeration 339 to the vapors in the top of said column. The bottoms product from column 337 is removed by pipe 340 and added to the liquid phase withdrawn from separator 335 through pipe 341 and the blend passed by pipe 342 through heat exchange zones 308, 307, 306 and 305 to discharge into pipe 314. A material balance is presented in Table II.

TABLE II

*Material balance for FIGURE 6*

[Basis: 100 mols of feed gas]

| Stream No. | 301 | 312 | 323 | 326 | 328 | 332 | 334 | 342 | 336 | 318 | 314 | 327 |
|---|---|---|---|---|---|---|---|---|---|---|---|---|
| Helium, mols | 0.75 | 0.016 | 0.734 | 0.003 | 0.731 | 0.724 | 0.007 | | 0.007 | | 0.016 | 0.019 |
| Nitrogen, mols | 14.84 | 3.388 | 11.452 | 2.102 | 9.350 | .576 | 8.774 | 1.044 | 7.73 | 0.057 | 3.331 | 6.534 |
| Methane, mols | 71.72 | 44.882 | 26.838 | 16.548 | 10.290 | .124 | 10.166 | 5.566 | 4.60 | 4.062 | 40.820 | 66.996 |
| Ethane, mols | 6.19 | 5.862 | .328 | .318 | 0.010 | | 0.01 | 0.010 | | 4.256 | 1.606 | 6.190 |
| Propane+, mols | 6.50 | 6.459 | .041 | .041 | | | | | | 6.265 | .194 | .235 |
| | 100.0 | 60.607 | 39.393 | 19.012 | 20.381 | 1.424 | 18.957 | 6.620 | 12.337 | 14.640 | 45.967 | 79.974 |

Figure 7:
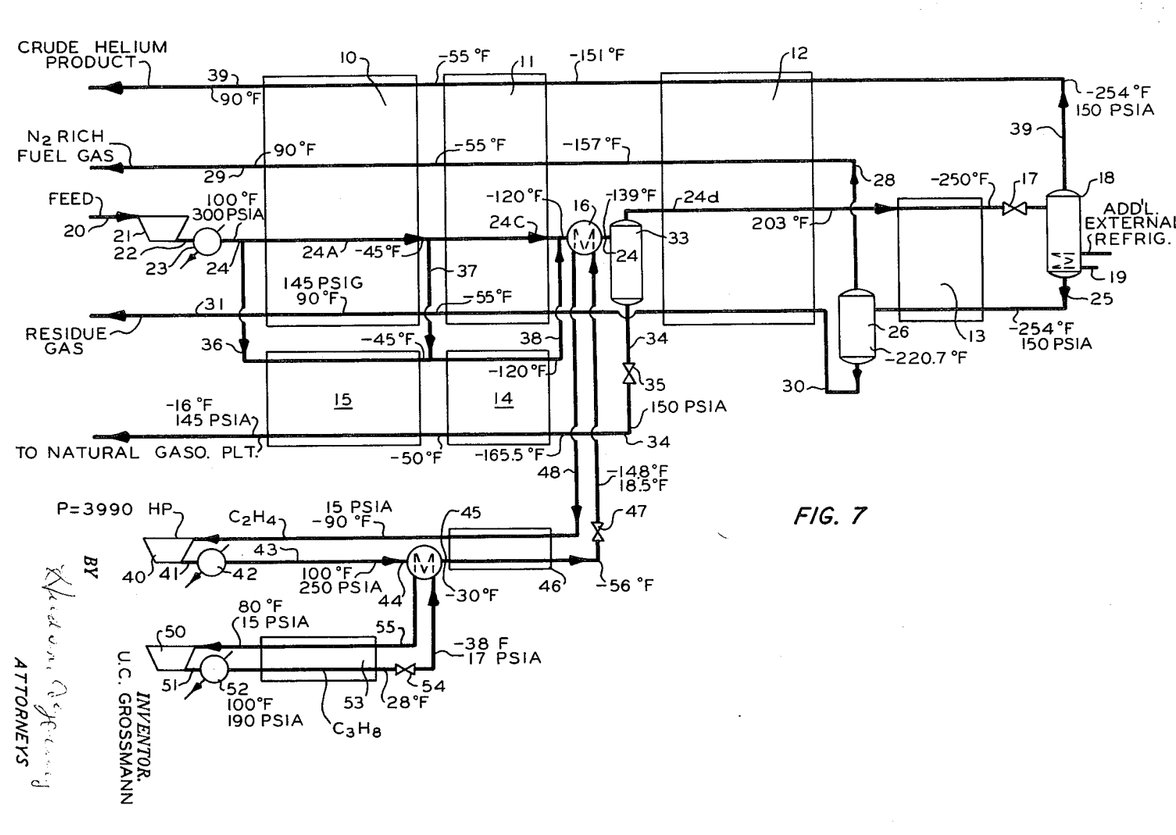
FIGURE 7 shows application of a conventional cascade refrigeration system to supply additional refrigeration when such is needed to make the separation of a natural gas into a helium product and other products in an operation set forth, described and claimed in copending application Serial Number 9,091, filed February 16, 1960, by R. D. Kuerston.

Referring now to FIGURE 7, there are shown diagrammatically heat exchange zones 10, 11, 12, 13, 14 and 15. Feed gas is passed by pipe 20, compressor 21, pipe 22, cooler 23, and pipe 24 into heat exchange zones 10 and 11, additional heat exchanger 16, heat exchanger zones 12 and 13 and then through expansion valve 17 into phase separator 18 to which additional external refrigeration is supplied by coil 19. The crude helium product is taken overhead from separator 18 by way of pipe 39 and passed through heat exchange zones 12, 11 and 10 for heat exchange therein with feed gas to recover refrigeration values. Bottoms liquid phase is removed from separator 18 by pipe 25, passed through heat exchange zone 13 to additional phase separator 26. Phase separator 26, as it appears and is used in the combination here discussed, is set forth, described and claimed in the above-mentioned Serial No. 9,091. The operation here described is so performed that overhead from separator 26 is taken off by pipe 28 and passed through heat exchange zones 12, 11 and 10, and results in a nitrogen-rich fuel gas at end 29 of pipe 28. This fuel gas can be used to power engines as in the above-mentioned Serial Number 9,091. Liquid from separator 26 is removed by pipe 30 and also passed through heat exchange zones 12, 11 and 10, resulting in a residue or natural gas at end 31 of pipe 30, and this gas has substantially the same composition as the feed gas since essentially only the helium, some of the nitrogen, and most of the heavy hydrocarbons have been removed.

As the feed is cooled in pipe 24, the higher boiling components of the gas condense and are removed by passing stream 24 into phase separator 33 and from phase separator 33 by pipe 34 and expansion valve 35 through heat exchangers 14 and 15 in which refrigeration is recovered from stream 34 by heat exchange with streams 36 and 38. Stream 38 is composed of streams 36 and 37 which are taken from stream 24 ahead of heat exchangers 10 and 11, respectively.

Compressor 40 compresses ethylene which is passed by pipe 41, cooler 42, and pipe 43 into heat exchanger 44, and by pipe 45, heat exchanger 46 and expansion valve 47 into heat exchanger 16 for heat exchange with feed from pipe 24. The ethylene returns from heat exchanger 16 by pipe 48 and heat exchange zone 46 to the suction of compressor 40. A propane refrigeration cycle is composed of compressor 50, pipe 51, cooler 52, heat exchanger 53, expansion valve 54, heat exchanger 44, and pipe 55, which passes through heat exchange zone 53. It will have been noted that compressors 40 and 50 operate a cascade refrigeration system to supply refrigeration ultimately to heat exchanger 16.

Material balance data for the flow scheme of FIGURE 7 are presented in Table III below.

TABLE III

*Material balance for FIGURE 7*

[Basis: 100 mols of feed gas]

| Stream No. | 20 | 24a* | 36* | 24c* | 38* | 34 | 24d | 39 | 25 | 28 | 30 |
|---|---|---|---|---|---|---|---|---|---|---|---|
| Helium, mols | 0.75 | | | | | 0.003 | 0.747 | 0.675 | 0.072 | 0.072 | |
| Nitrogen, mols | 14.84 | | | | | 0.607 | 14.233 | 0.742 | 13.491 | 5.234 | 8.257 |
| Methane, mols | 71.72 | | | | | 13.194 | 58.526 | | 58.526 | 4.22 | 54.306 |
| Ethane, mols | 6.19 | | | | | 4.665 | 1.525 | | 1.525 | | 1.525 |
| Propane +, mols | 6.50 | | | | | 6.101 | 0.399 | | 0.399 | | 0.399 |
| | 100.00 | 70.87 | 29.13 | 39.62 | 60.38 | 24.570 | 75.430 | 1.417 | 74.013 | 9.526 | 64.487 |

*Same composition as stream 20.

Figure 8:
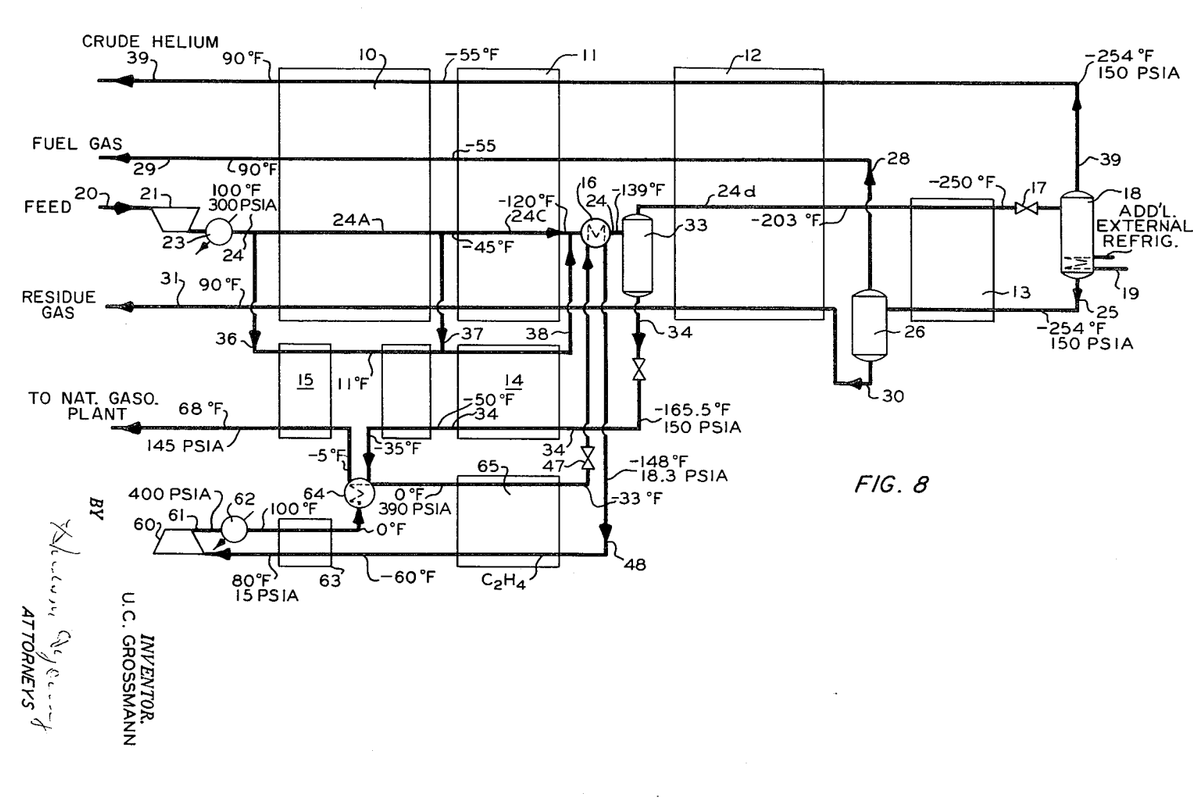
FIGURE 8 shows an application of the heat pump principle of the invention to a specific method of recovering helium from natural gas, the method except for the combination employing said heat pump to avoid pinches, being set forth, described, and claimed in copending application Serial Number 9,091, filed February 16, 1960, by R. D. Kuerston.

The flow streams, as analyzed in Table III apply also to FIGURE 8, which will now be described. FIGURE 8 is essentially FIGURE 7 but modified according to the invention to omit the cascade refrigeration cycle and to include, according to the present invention, the heat pump arrangement thereof.

In FIGURE 8, components which are identical with components of FIGURE 7 have been given identical numbers. According to the invention, the requirement of power to supply added refrigeration with the conventional cascade refrigeration cycle shown in FIGURE 7 is 8,270 H.P. whereas with the heat pump cycle, as about to be described in connection with FIGURE 8, it is only 7,250 H.P. Thus, it requires an excess of 13 percent more power without this invention to avoid temperature pinches in the countercurrent heat exchangers.

It aids in understanding the description and meaning of FIGURE 8 to state now that comparison is ultimately made between the temperature at the outlet of pipe 34 from heat exchanger 15, at which place in FIGURE 7 the temperature is −16° F. whereas in FIGURE 8 it is +68° F. It is evident that refrigeration is recovered in FIGURE 8 which is not recovered in FIGURE 7 resulting in a lower power requirement for the invention shown in FIGURE 8.

Referring now to FIGURE 8, there is provided compressor 60 in an ethylene refrigeration cycle pumping ethylene through pipe 61, cooler 62, and heat exchange zone 63 into heat exchanger 64 for heat exchange with stream 34 and then through heat exchange zone 65, expansion valve 47 into heat exchanger 16 to supply additional refrigeration and from heat exchanger 16 by pipe 48 through heat exchange zones 65 and 63 to the suction of compressor 60. It will be seen upon a study of FIGURE 8 that heat has been removed from stream 24 in exchanger 16 and that essentially this same heat is then added to stream 34 in exchanger 64.

From the foregoing example, it is evident that according to the invention there is provided a method for the refrigeration of a fluid in which method there is effected recovery of refrigeration values by heat interchange of fluid, which is to be refrigerated with fluid which has been refrigerated and in which a temperature pinch is to be avoided, which comprises the steps of recovering refrigeration values from fluid that has been refrigerated at a point at which these are available in the method and transferring said values to fluid being refrigerated at a point in the method where its addition avoids a temperature pinch.

More specifically, a stream in a refrigeration cycle is passed into heat exchange contact with a cold stream at a point at which the cold stream can be heated without adverse effect on a system, following which said thus cooled stream is transferred to a place at which refrigeration is required to provide the same, preferably further cooling due to expansion of said stream to a lower pressure.

In a now preferred mode of operation, the stream in the refrigeration cycle, which is used, is under a fairly high pressure as distinguished from the pressure elsewhere in the operation where heat exchange is taking place in a conventional manner, and this stream under said high pressure is heat-exchange contacted with the stream which is heated without disadvantage, thus taking in refrigeration values at said high pressure prior to further cooling of said stream or after cooling of said stream in said refrigeration cycle and before it is expanded in said cycle.

Figure 9:
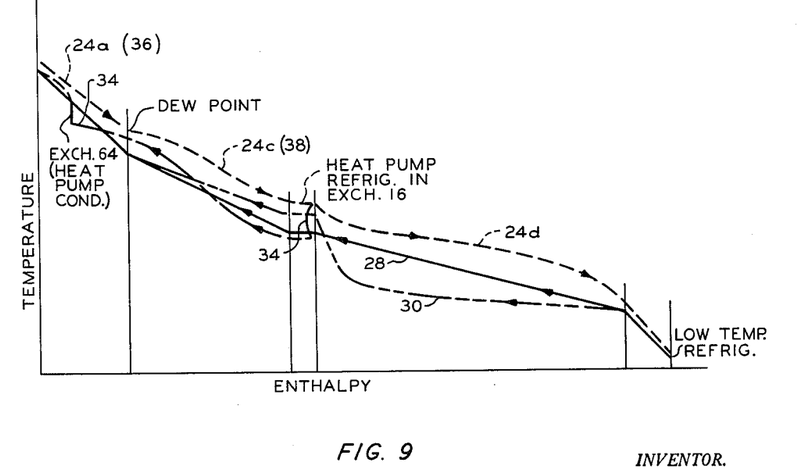
FIGURE 9 illustrates graphically the avoidance of temperature pinch employing the heat pump principle in FIGURE 8 of the present invention.

Referring now to FIGURE 9, the numbered places thereon will be seen to correspond to points of FIGURE 8 which are likewise numbered.

Figure 10:
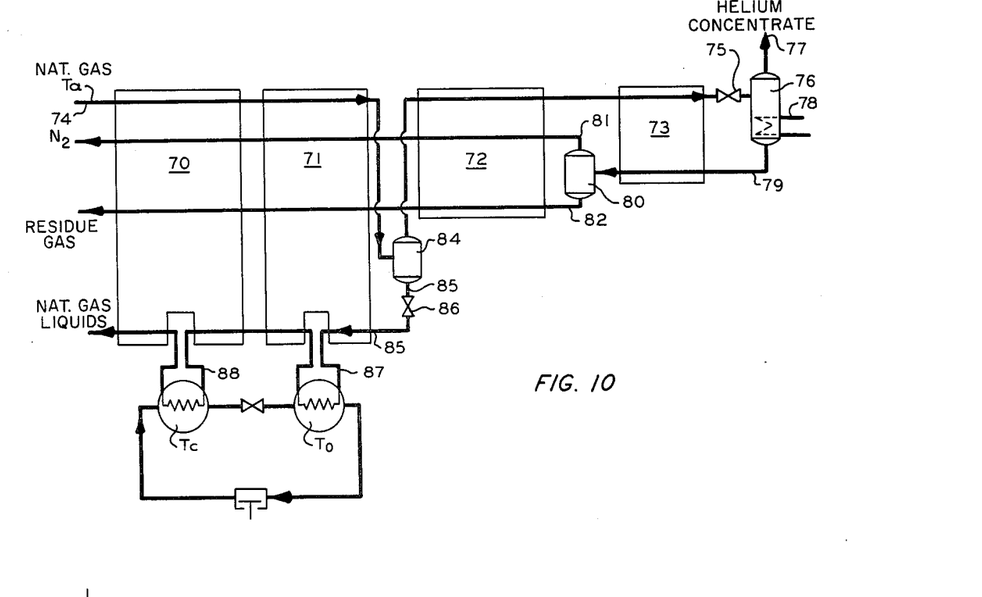
FIGURE 10 illustrates diagrammatically another application of a heat pump to a residue stream which is being used in heat interchange and in which there is insufficient refrigeration value at an upstream point thereof to which point the heat pump cycle transfers refrigeration value from a downstream point of said stream.

Referring now to FIGURE 10, there are provided heat exchange zones 70, 71, 72 and 73 through which is passed a stream of natural gas 74 from which, after refrigeration in said zones and expansion at valve 75 and phase separation in separator 76, a helium concentrate is removed at 77. External refrigeration is supplied by means of coil 78. Bottoms from separator 76 are passed by pipe 79 through heat exchanger 73 to phase separator 80 wherein bottoms 79, warmed in exchanger 73, release gases passed as overhead by pipe 81 into heat exchange with incoming gas in zones 72, 71 and 70. Likewise, liquid from separator 80 is passed by pipe 82 through zones 72, 71 and 70. There is obtained and separated from the incoming gases being condensed a stream of liquid natural gas hydrocarbons which is passed by pipe 85 and expansion valve 86 through heat exchangers 71 and 70 by branches 87 and 88. The hydrocarbons in pipe 85 are used in heat exchange zones 71 and 70 to cool incoming gases and it develops that a temperature pinch would exist between stream 74 and stream 85 in zone 71. According to the invention, the heat pump cycle is provided to supply refrigeration value to stream 85 by means of branch 87 from branch 88, thus avoiding the temperature pinch in zone 71.

Figure 11:
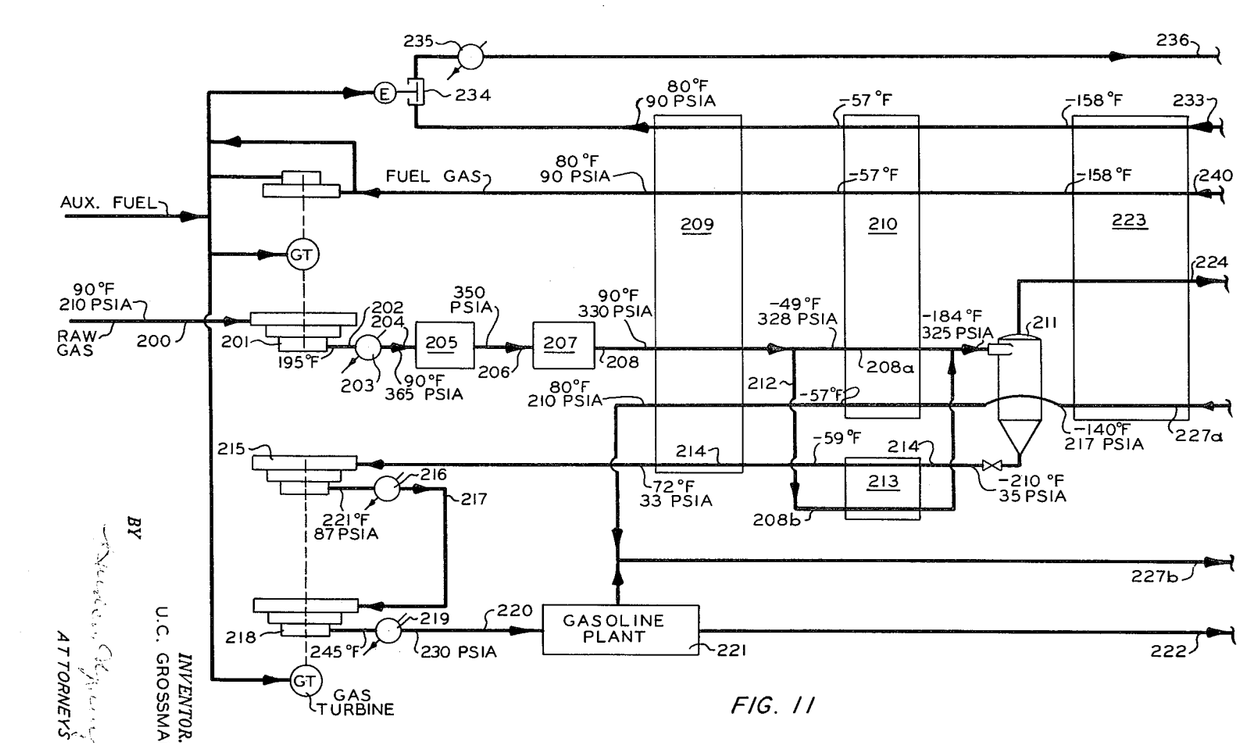
FIGURES 11 and 11a, on two sheets, illustrate diagrammatically an embodiment of the invention in which there is operated upon the residual liquid, obtained upon separation of the helium concentrate, a pump to compress this liquid, as a liquid, following which it is combined, advantageously, with a residual liquid obtained from the natural gas prior to separation of the helium concentrate therefrom, and used together with said last mentioned liquid to cool natural gas on its way to the helium concentrate separation step.
Figure 11A:
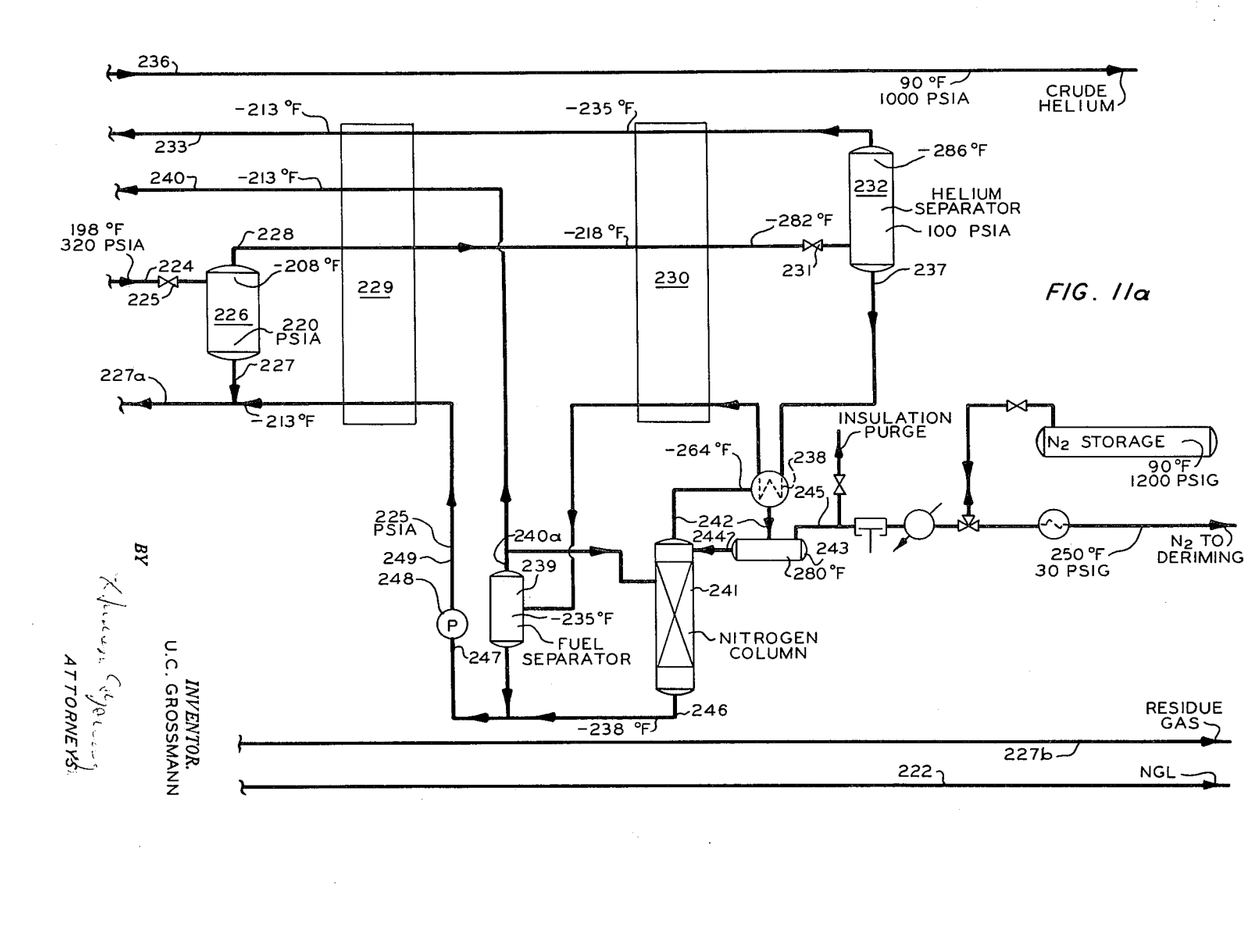

Finally, referring to FIGURES 11 and 11a, raw gas passes through pipe 200, compressor 201, pipe 202, cooler 203, and pipe 204 to treater zone 205 which, in this instance, is an amine treater zone in which carbon dioxide is removed. The treated gas is passed through pipe 206 to dehydrator 207 and pipe 208 through heat exchange zones 209 and 210 into cyclone phase separator 211. A portion of the gas is, in this embodiment, bypassed by pipe 212 and heat exchange zone 213 for heat interchange with separated phase removed from separator 211 by pipe 214. The separated phase contains natural gasoline constituents and is passed by pipe 214 through heat exchange zone 209, compressor 215, cooler 216, pipe 217, compressor 218, cooler 219, and pipe 220 into natural gasoline plant 221 from which natural gasoline liquids are recovered by pipe 222. Uncondensed gases pass from separator 211 through heat exchange zone 223 by pipe 224 and through expansion valve 225 into phase separator 226 from which liquid is passed by pipe 227 through heat exchange zones 223, 210 and 209 and ultimately from the process as residue natural gas containing a high percentage of methane. Overhead from separator 226 passes by pipe 228 through heat exchange zones 229 and 230 and expansion valve 231 into helium separator 232, from which there is taken off overhead by pipe 233 and passed through heat exchange zones 230, 229, 223, 210 and 209, a helium concentrate consisting essentially of helium and nitrogen, which is compressed by compressor 234, is passed through cooler 235 and passed by pipe 236 from the process as crude helium. Bottoms from helium separator 232 are passed by pipe 237, heat exchanger 238, and heat exchange zone 230 to fuel separator 239, overhead from which, consisting essentially of nitrogen and methane is passed by pipe 240 and heat exchange zones 229, 223, 210 and 209 to fuel gas utilization. As desired, a portion of the gases in pipe 240 are passed to nitrogen column 241 wherein a substantially pure nitrogen is recovered by pipe 242, heat exchanger 238, and pipe 242 and accumulated in accumulator 243 from which a reflux stream 244 is supplied to column 241 and from which nitrogen for purging and deriming purposes is removed by pipe 245. Some or all of the nitrogen can be used for deriming, according to the invention. Bottoms from column 241 are removed by pipe 246 and join the liquid in pipe 247. According to the invention, bottoms from separator 239 are passed by pipe 247 and pump 248 and, in a liquid phase, pumped at an increased pressure by pipe 249 through heat exchange zone 229 into admixture with liquid in pipe 227 and thus further utilized for heat exchange purposes. Although shown as passing through heat exchange zone 229 in a specific embodiment, it will be clear to one skilled in the art that a basic concept of the invention as now discussed is in the pumping or compressing of separated liquid from a fuel separator in the recovery of helium to a higher pressure, in this instance, from a pressure of somewhat less than 100 p.s.i.a. to a pressure of 225 p.s.i.a., and then utilizing the same as liquid for heat exchange purposes, avoiding the compression of a gas in a helium separation operation following the separation of helium from earlier liquefied natural gas.

Material balance data for FIGURE 11 are presented below in Table IV.

Reasonable variation and modification are possible within the scope of the foregoing disclosure, the drawings, and the appended claims to the invention the essence of which is that there has been provided a method and/or system in the refrigeration of a fluid in which system there is effected a recovery of refrigeration values by heat interchange of fluid which is to be refrigerated with a fluid which has been refrigerated and wherein a temperature pinch is to be avoided, which comprises the steps of recovering refrigeration values at a point at which these are available in the system and can be taken from said point without developing said pinch and transferring said values to a point in the method or system where a temperature pinch would otherwise exist and would require additional external energy for the additional refrigeration needed at said pinch, the concept of the invention being applicable in cycles in which the closest temperature difference in the heat exchange is not at the warm end, wherein a plurality of streams from a stream under pressure being condensed are removed at different stages of condensation of the stream to be condensed, expanded to sufficiently low pressures as to require no auxiliary refrigeration and passed into heat exchange with said stream being condensed, wherein the first stream removed from said stream being condensed is expanded, partially vaporized and lighter, gaseous components separated from the remaining heavier liquid components, and said heavy components stream further expanded to recover refrigeration values therefrom, wherein a vapor stream is removed from said steam being condensed and made to do work by expansion through an expansion engine or turbine or equivalent zone, preferably after heat exchange with the stream being condensed, wherein a stream is removed from the stream being condensed and is purified to produce a stream essentially consisting of a pure component of said fluid.

I claim:

1. A method for the recovery of natural gas liquids from a natural gas containing helium which comprises cooling said gas under pressure, separating from said gas as it is being cooled a $C_3$-rich fraction and passing said fraction in heat exchange relationship with the incoming natural gas, then when the natural gas has been further cooled separating therefrom a stream containing a large proportion of methane and a smaller proportion of nitrogen, separating from said methane and nitrogen containing stream a stream containing a substantial proportion of methane and a reduced proportion of nitrogen, obtaining a stream containing an increased proportion of nitrogen but containing methane, passing said stream containing an increased proportion of nitrogen to a nitrogen purification step, therein recovering nitrogen from which a substantial proportion of the methane has been removed, recovering methane from said step, cooling further the remainder of the cooled and partially condensed natural gas, obtaining therefrom a helium concentrate, passing said helium concentrate in heat exchange relationship to the incoming natural gas, obtaining upon separation of the helium concentrate from the cooled and condensed natural gas a gas containing essentially nitrogen and methane which is suitable for fuel and passing said gas also into heat exchange relationship with the incoming natural gas.

2. A recovery operation according to claim 1 wherein the liquid stream remaining upon separation of the helium concentrate is employed, at least in part, to cool the nitrogen purification step.

3. A method for the recovery of increased amounts of natural gas liquids and a helium concentrate from a natural gas stream containing the same employing only refrigeration values generated with energy in the gases fed to the operation and employing only expansion of streams

TABLE IV

*Material balance for FIGURES 11 and 11a*

[Basis: 100 mols of raw gas]

| Stream No. | 208 | 208A [1] | 208B [1] | 214 | 222 | 224 | 227 | 227A | 227B | 228 | 233 | 237 | 240 | 240A | 245 | 249 |
|---|---|---|---|---|---|---|---|---|---|---|---|---|---|---|---|---|
| Helium, mols | 0.75 | | | 0.003 | | 0.747 | 0.018 | 0.02 | 0.02 | 0.729 | 0.727 | 0.002 | 0.00 | 0.002 | 0.002 | 0.00 |
| Nitrogen, mols | 14.84 | | | 0.65 | | 14.19 | 9.01 | 9.19 | 9.84 | 5.18 | 0.59 | 4.59 | 4.34 | 4.41 | 0.07 | 0.18 |
| Methane, mols | 71.72 | | | 13.45 | | 58.27 | 53.80 | 55.22 | 68.67 | 4.47 | 0.05 | 4.42 | 3.00 | 3.00 | | 1.42 |
| Ethane, mols | 6.19 | | | 4.50 | | 1.69 | 1.68 | 1.69 | 6.19 | 0.01 | | 0.01 | | | | 0.01 |
| Propane+, mols | 6.50 | | | 6.07 | 4.80 | 0.43 | 0.43 | 0.43 | 1.70 | | | | | | | |
| Total | 100.00 | 28.6 | 71.4 | 24.67 | 4.80 | 75.33 | 64.938 | 66.55 | [2] 86.42 | 10.389 | 1.367 | 9.022 | [3] 7.34 | 7.412 | 0.072 | 1.61 |

[1] Composition same as stream 208.  [2] 979 B.t.u./ft.$^3$.  [3] 413 B.t.u./ft.$^3$.

in the operation to obtain said refrigeration values, thereby avoiding external energy produced refrigeration which comprises passing said gas stream at an elevated pressure, such that by steps herein set forth said recovery can be attained, serially through at least four consecutive cooling and partial condensing stages, after each of said stages passing the gas stream directly into and through a liquid from gas separation zone located immediately following each of said four stages, the gas stream being passed to each of said separation zones being the sole stream fed to each of said separation zones and in each of said separation zones employing only the energy contained in said gas stream fed thereto to effect the separation therein, passing substantially all of each of the liquid streams thus obtained from said separation zones into indirect heat exchange only upstream from each of said separation zones with the natural gas stream being cooled and partially condensed, the heat in the gas stream, which is being cooled and partially condensed in each of said stages, being removed only by indirect heat exchange with the liquid stream obtained from each of said liquid separation zones which follows said stage, passing the final gas stream thus obtained from the system as a helium concentrate containing essentially only nitrogen and helium, reducing the pressures on a plurality of said liquid streams obtained from said liquid separation zones to a pressure such, depending upon the composition thereof and correlated therewith, that said plurality of liquid streams will evaporate and take in latent heat of evaporation by removal of heat from the natural gas being cooled therewith when passed into said indirect heat exchange, passing each of said plurality of liquid streams into heat exchange relationship with substantially all of the incoming natural gas preceding the separation zone from which each of said plurality of liquid streams has originated, expanding at least one cooled natural gas stream, which has been submitted to at least two cooling stages and to at least two liquid separations as above defined, prior to submitting said last-mentioned cooled natural gas stream to further separation of liquid therefrom, separating liquid from said last-mentioned cooled natural gas stream, and recovering as products of the method of the gases from each of said liquid streams which been used as described.

4. A method for the recovery of increased amounts of natural gas liquids and a helium concentrate from a natural gas stream containing the same employing only refrigeration values generated with energy in the gases fed to the operation and employing only expansion of streams in the operation to obain said refrigeration values, thereby avoiding external energy produced refrigeration which comprises passing said gas stream at an elevated pressure of the order of about 300 p.s.i.a. serially through at least four consecutive cooling and partial condensing stages, after each of said stages passing the gas stream directly into and through a liquid from gas separation zone located immediately following each of said four stages, the gas stream being passed to each of said separation zones being the sole stream fed to each of said separation zones and in each of said separation zones employing only the energy contained in said gas stream fed thereto to effect the separation therein, so conducting the operation as herein described that the first three of said separation zones are maintained respectively and in the order in which they are reached by the gas stream being passed thereto at temperatures of the order of $-100°$ F., $-150°$ F., $-230°$ F., passing substantially all of each of the liquid streams thus obtained from said separation zones into indirect heat exchange only upstream from each of said separation zones with the natural gas stream being cooled and partially condensed, the heat in the gas stream which is being cooled and partially condensed in each of said stages, being removed only by said indirect heat exchange, passing the final gas stream thus obtained from the system as a helium concentrate containing essentially only nitrogen and helium, reducing the pressure on at least the first two of a plurality of said liquid streams obtained from said separation zones to a pressure such, depending upon the composition thereof and correlated therewith, that said two liquid streams will evaporate and take in latent heat of evaporation by removal of heat from the natural gas being cooled therewith when passed into said indirect heat exchange, the pressures to which the pressures on said two streams are reduced being respectively, and in the order in which obtained, of the order of 50 p.s.i.a. and 100 p.s.i.a., then passing each said two liquid streams into heat exchange relationship with substantially all of the incoming natural gas preceding the separation zone from which each of said two liquid streams has originated, expanding at least one cooled natural gas stream, which has been submitted to at least two cooling stages and to at least two liquid separations as above defined to a pressure of the order of 200 p.s.i.a., prior to submitting said last-mentioned cooled natural gas stream to further separation of liquid therefrom, passing the liquid separated from the last of said separation zones at a pressure of the order of about 120 p.s.i.a. into its indirect heat exchange with the incoming natural gas, and recovering the gases from each of said liquid streams which have been used as described.

References Cited by the Examiner

UNITED STATES PATENTS

| | | | |
|---|---|---|---|
| 1,394,955 | 10/21 | Recklinghausen | 62—41 |
| 1,420,626 | 6/22 | Davis | 62—38 |
| 1,530,461 | 3/25 | Graham | 62—23 |
| 1,913,805 | 6/33 | Hausen. | |
| 1,962,176 | 6/34 | De Baufre | 62—40 |
| 1,989,190 | 1/35 | Frankl | 62—38 |
| 2,122,238 | 6/38 | Pollitzer. | |
| 2,265,558 | 12/41 | Ward | 62—23 |
| 2,484,875 | 10/49 | Cooper | 62—40 |
| 2,500,118 | 3/50 | Cooper | 62—28 |
| 2,547,177 | 4/51 | Simpson | 62—29 |
| 2,557,171 | 6/51 | Budle. | |
| 2,582,068 | 1/52 | Roberts. | |
| 2,591,658 | 4/52 | Haringhuizen. | |
| 2,641,114 | 6/53 | Holthaus | 62—23 |
| 2,711,085 | 6/55 | Anderson | 62—41 |
| 2,716,332 | 8/55 | Haynes | 62—31 |
| 2,814,936 | 12/57 | Morrison | 62—23 |
| 2,940,271 | 6/60 | Jackson | 62—23 |
| 2,973,834 | 3/61 | Cicalese | 62—23 |
| 3,026,682 | 3/62 | Palazzo. | |
| 3,062,015 | 11/62 | Cost | 62—23 |

NORMAN YUDKOFF, *Primary Examiner.*

ROBERT A. O'LEARY, *Examiner.*